United States Patent [19]

Grachten

[11] 4,273,737
[45] Jun. 16, 1981

[54] METHOD AND APPARATUS FOR MANUFACTURING FURNITURE

[75] Inventor: Erich Grachten, Detmold, Fed. Rep. of Germany

[73] Assignee: Burris Industries, Inc., Lincolnton, N.C.

[21] Appl. No.: 549,519

[22] Filed: Feb. 13, 1975

[51] Int. Cl.³ .................. B29C 5/00; B29D 27/04; B29C 27/00
[52] U.S. Cl. .................. 264/46.5; 264/251; 264/261; 264/328.1
[58] Field of Search .................. 264/46.4, 46.5, 46.6, 264/261, 263, 250, 328, 46.7, 251

[56] References Cited

U.S. PATENT DOCUMENTS

| 1,276,624 | 8/1918 | Cummings | 264/261 |
| 2,392,734 | 1/1946 | Haberstump | 264/261 |
| 2,409,958 | 10/1946 | Rogers et al. | 264/261 |
| 2,744,042 | 5/1956 | Pace | 264/46.5 |
| 2,764,516 | 9/1956 | Pace | 264/46.5 |
| 2,993,233 | 7/1961 | Hoppe et al. | 264/46.6 |
| 3,026,575 | 3/1962 | Cusher et al. | 264/328 |
| 3,087,207 | 4/1963 | Styra | 264/259 |
| 3,154,617 | 10/1964 | Shenk et al. | 264/328 |
| 3,328,499 | 6/1967 | Barnette | 264/245 |
| 3,546,841 | 12/1970 | Smith et al. | 264/46.5 |
| 3,895,984 | 7/1975 | Cone et al. | 264/46.5 |
| 3,917,779 | 11/1975 | Breer et al. | 264/46.7 |

FOREIGN PATENT DOCUMENTS 46-7470 2/1971 Japan .................. 264/46.7

Primary Examiner—W. E. Hoag

[57] ABSTRACT

A method and an apparatus for manufacturing furniture by joining panels and making corners, in which at least two panels each having generally parallel generally planar major faces and a generally planar end surface bounding one edge of the major faces are arranged with mold instrumentalities to form a mold cavity bounded in part by the respective end surfaces of the two panels. Plastic material is deposited into the mold cavity and the two panels are bonded together into a corner configuration by the plastic material while the plastic material is confined and shaped into a predetermined configuration. The plastic material preferably is a structural foam material and the mold instrumentalities preferably define an inclined, heated mold cavity in which reactants may form the structural foam.

6 Claims, 9 Drawing Figures

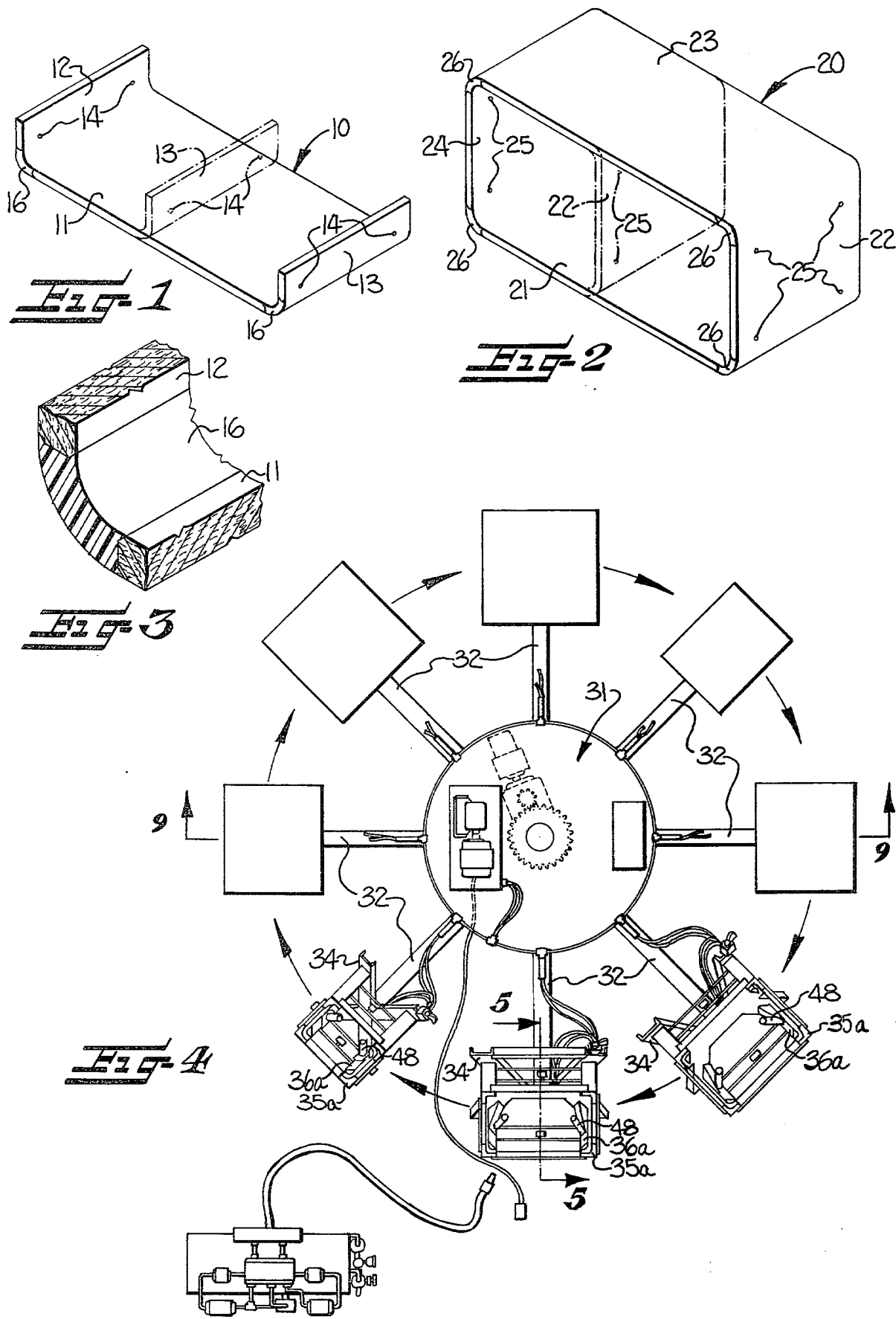

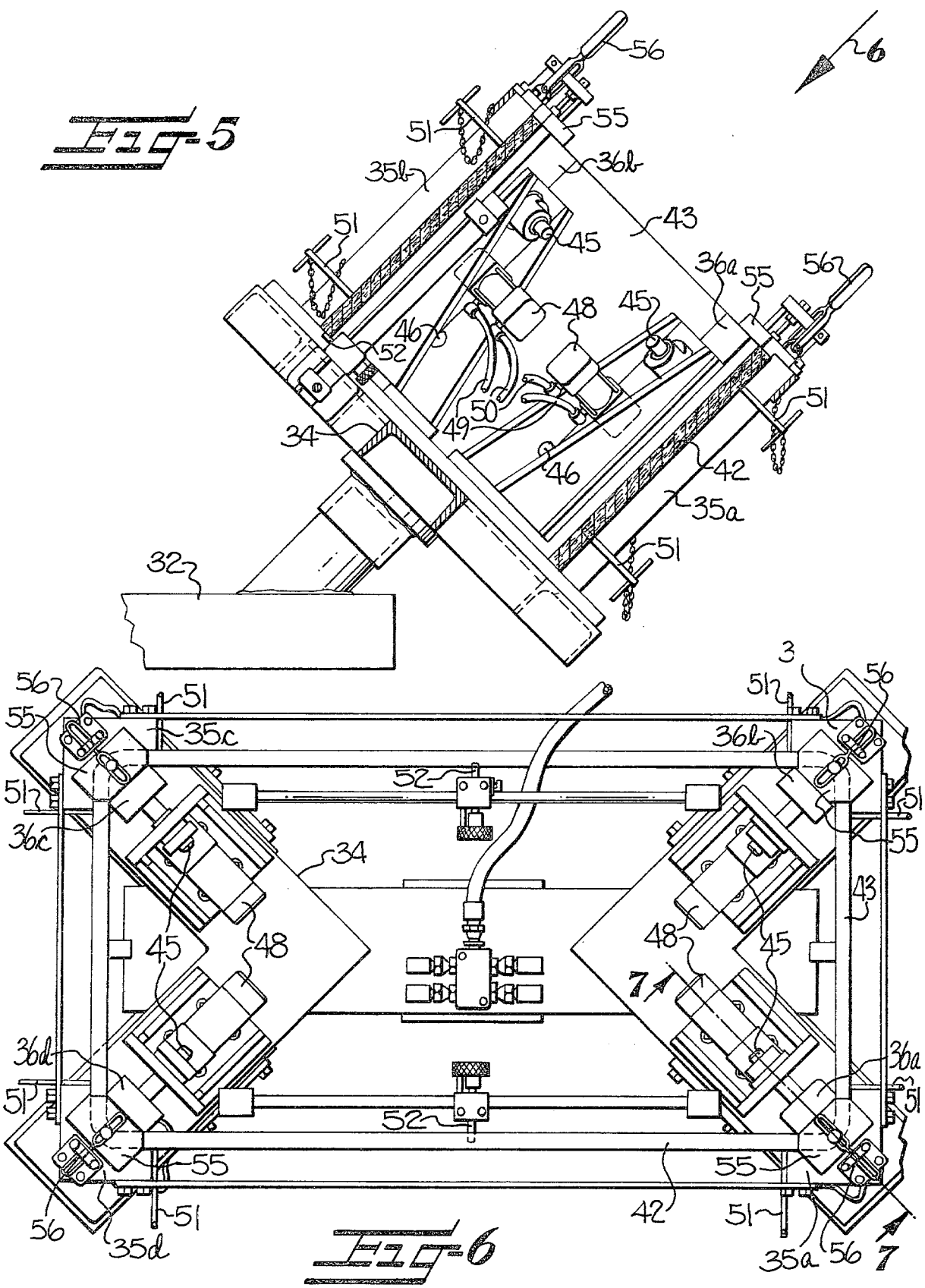

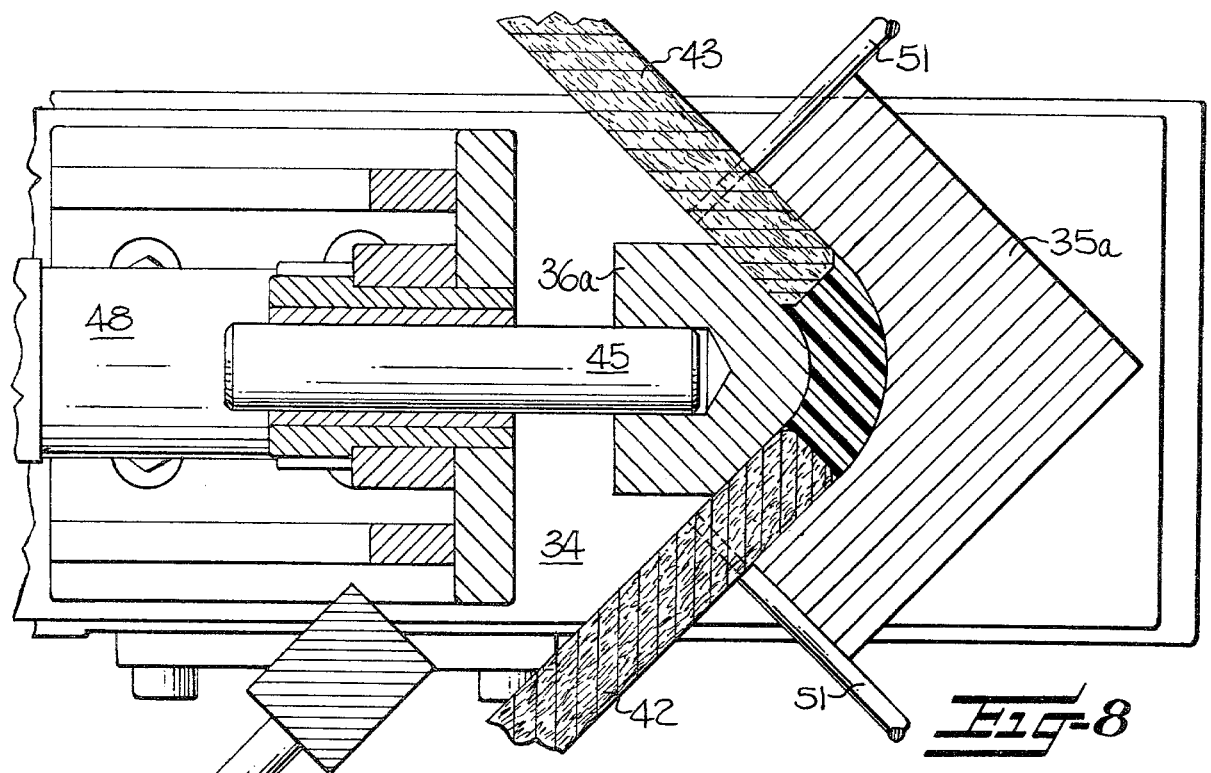
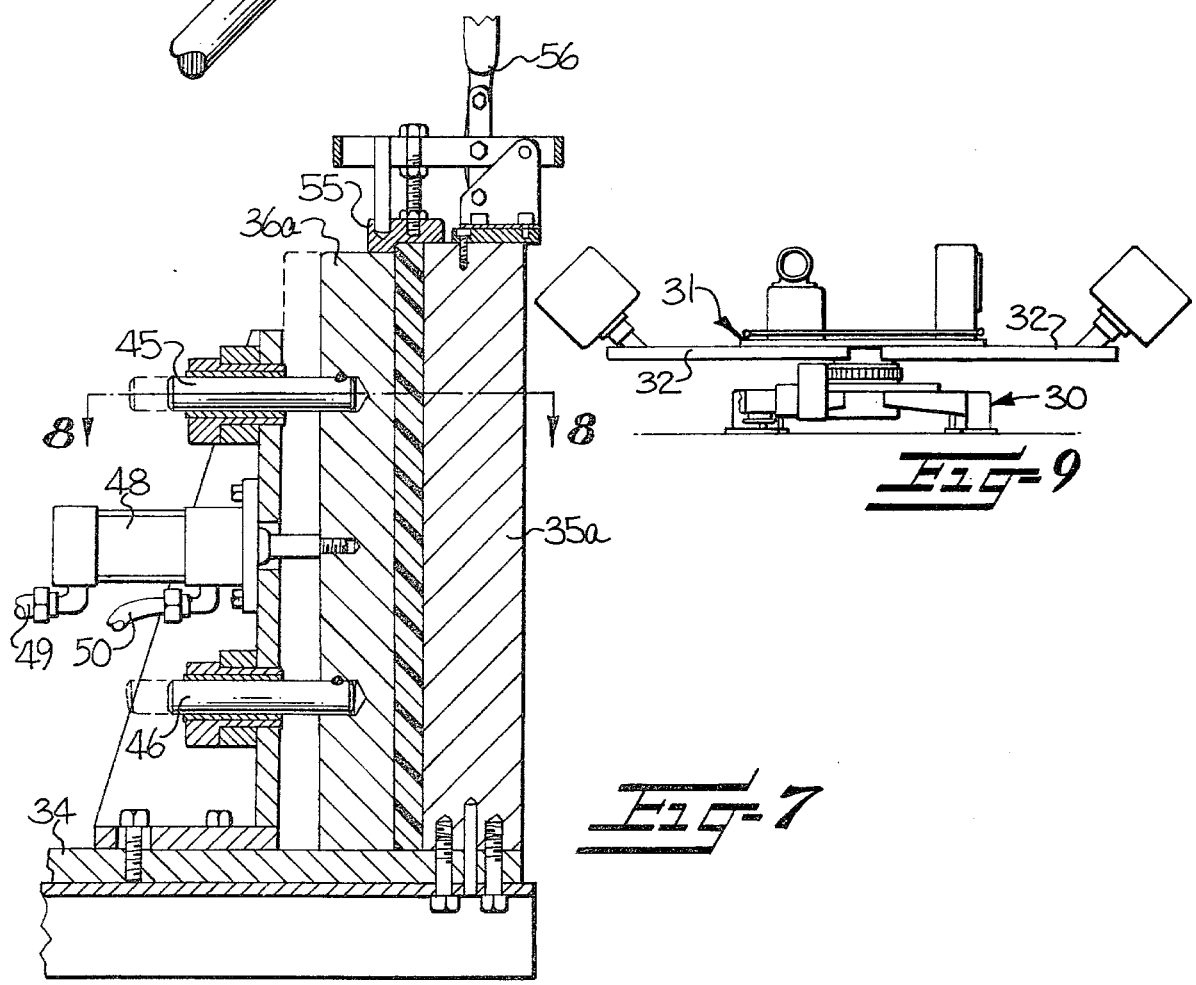

METHOD AND APPARATUS FOR MANUFACTURING FURNITURE

Articles of furniture such as shelves, cabinets and various case goods have long been manufactured by processes which have included shaping panels of wood or other chosen material and then joining the panels at corners of the furniture structure. Conventional woodworking practice has developed a range of techniques for such joinery, with most conventionally practiced processes producing right angular joints as is shown by the square-corner configuration of most furniture.

In certain instances, it is desirable to join panels in a relationship other than the relatively simple square, right angular joint. Where such modified corner configurations are considered desirable, techniques have been developed for such joinery, including careful craftsmanship of multiple panel components, bending of suitable materials such as plywood and the like, and fabrication of metal joints. All such techniques suffer significant deficiencies in relying heavily upon accurate, highly skilled craftsmanship or in being expensive. For one or both of these two reasons, by far the large majority of furniture manufacturing relies upon the conventional square, right angular corner to which woodworking technology is particularly well adapted.

With the foregoing in mind, it is an object of the present invention to accommodate the manufacture of furniture by joining panels and making corners while accomplishing formation of any desired corner configuration. In accomplishing this object of the present invention, furniture characterized by having corner portions of irregular or curved shapes may be manufactured without the necessity of reliance upon highly skilled craftsmanship or expensive specially fabricated components.

Yet a further object of this invention is the provision of apparatus for manufacturing furniture by joining panels and making corners of any desired configuration in which mold portions receive end portions of panels and cooperate with surfaces of the received panels for defining a mold cavity. In accordance with this object of the present invention, the mold portions cooperate with the panels to be joined in confining and shaping plastic materials which bonds the panels together into an article of furniture. The provision of such apparatus in accordance with this invention facilitates mechanization of furniture manufacture as contemplated by this invention.

It is yet a further object of this invention to facilitate the joining of panels into articles of furniture by promoting the bonding of plastic material to panel end surfaces which define portions of the boundary of a mold cavity. In realizing this object of the present invention, the panels and cooperating mold instrumentalities are heated to an elevated temperature and are disposed at a predetermined angulation, aiding proper setting of plastic material.

Some of the objects of the invention having been stated, other objects will appear as the description proceeds, when taken in connection with the accompanying drawings, in which FIG. 1 is a perspective view of an article of furniture (in the form of a shelf) made in accordance with the method and through the use of the apparatus of this invention;

FIG. 2 is a perspective view similar to FIG. 1 of an article of furniture (in the form of a cabinet or case) produced in accordance with the method and through the use of the apparatus of this invention;

FIG. 3 is an enlarged perspective view of a corner of an article of furniture such as the articles of FIGS. 1 and 2;

FIG. 4 is a plan view of an apparatus in accordance with this invention;

FIG. 5 is an enlarged scale elevation view, partially in section, through a portion of the apparatus in FIG. 4, taken generally along the line 5—5 in that figure;

FIG. 6 is an angular plan view of the apparatus of FIG. 5, generally as indicated by the arrow 6 in that figure;

FIG. 7 is a sectional view, taken along line 7—7 of FIG. 6;

FIG. 8 is an enlarged sectional plan view, taken along line 8—8 of FIG. 7, showing the cooperation of two panels in the formation of a corner; and FIG. 9 is an elevation view, in section through the apparatus of FIG. 4, taken generally along the line 9—9 in that figure.

While this invention has been illustrated in the accompanying drawings and will be described hereinafter with particular reference to the best mode of this invention known at the time that the drawings and description are prepared, it is to be understood at the outset that the principals of this invention are contemplated as being applicable to procedures and apparatus which may differ in specifics from those here shown and described. Stated differently, it is contemplated that the disclosure here made will enable persons skilled in the applicable arts to practice the present invention in forms which may vary from the specifics which will be stated here. Accordingly, it is contemplated that this invention be understood broadly, and that the drawings and description not be taken as limiting on the scope of this invention.

Referring now more particularly to the accompanying drawings, articles of furniture produced in accordance with the method of this invention and through the use of the apparatus of this invention may take a variety of forms. As shown in FIGS. 1 and 2, articles of furniture include shelf members generally indicated at 10 and cabinet or case members generally indicated at 20. In the instances of shelf members 10, the members are formed by joining together three panels, with one panel 11 providing the major length of the shelf 10 (and to be disposed horizontally during use) and with two shorter panels 12, 13 providing upstanding end portions. Each of the upstanding end portions 12, 13 is bored through with openings 14, to be penetrated by appropriate fasteners during assembly of the shelf 10 with other furniture components in a manner which forms no pertinent part of the present invention. As indicated in phantom lines, the main panel 11 may be of varying lengths, in order to provide shelves 10 of desired dimensions.

Similarly, the case member 20 is formed by four panel members 21, 22, 23, 24, joined together into a generally rectangular box for use as a cabinet or case. One pair of opposing members 22, 24 are provided with mounting openings 25.

Each of the panels 11, 12, 13, 21, 22, 23, 24 has generally parallel, generally planar major faces and at least one generally planar end surface bonding one edge of the major faces. Preferably, the panels are formed of chip board or other economical wooden material. Chip board is preferred due to the relativlely low cost of such a material, the adaptation of the material to a range of appropriate finishes, and the bonding characteristics of the panels as will be described more fully hereinafter.

In both the shelf 10 and case 20, adjoining pairs of panels have end surfaces thereof bonded together by a body of plastic material (indicated at 16 in FIG. 1 and at 26 in FIG. 2). The bonding of end portions of panels is made more clear by the enlarged view of FIG. 3, where portions of two panels 11, 12 are shown and the body 16 of plastic material may be seen to have been shaped into a predetermined corner configuration. In the particular form illustrated, the body of plastic material 16 has been shaped into a curved corner, but it is to be understood that other configurations may be imparted consistant with the teachings of this invention. The body 16 of plastic material preferably is one of that class of materials which has come to be known in the plastic industries as "structural foam". This term will be understood by persons skilled in the plastic molding arts to encompass a range of thermoplastic and thermosetting materials available from a number of suppliers to the plastic industries. While it is contemplated that a two component thermosetting system would be particularly desirable, it is also contemplated that the method and apparatus of this invention may be used with a variety of the plastic materials and systems offered to the trade generally.

In manufacturing articles such as the shelf 10 and case 20, panels of appropriate size are arranged with mold instrumentalities to form a mold cavity bounded by respective end surfaces of two panels and by the mold instrumentalities. Plastic material is then deposited into the mold cavity and the panels are bonded together with the plastic material while the plastic material is confined within the cavity and shaped into the predetermined corner configuration. In accordance with the present invention, this method is preferably accomplished in an apparatus as is illustrated in FIGS. 4–9 and will now be described.

In order to facilitate relatively high production rates of articles of furniture through the use of the apparatus and method of this invention, provision is made for moving molds between work stations for reception of panels, deposition of plastic material and removal of bonded panels. In the illustrated apparatus, this arrangement includes a stationary base 30 (FIG. 9), a turntable 31 mounted on the stationary base 30 for rotation, and a plurality of arms 32 extending outwardly from the turntable and each mounting a corresponding mold structure. Inasmuch as the mold structure on each of the arms 32 substantially corresponds to the other mold structures, only one such mold structure will be described in detail here, with it being understood that the mold structures not illustrated in full detail or described are similarly constructed and used.

Each of the molds mounted at the outer end of one of the arms 32 includes a baseplate 34 (FIGS. 5–7) which defines lower terminal ends of mold cavities as described hereinafter. Mounted on the baseplate 34 are cooperating pairs of mold instrumentalities, each of which includes an outer corner mold portion 35a, 35b, 35c, 35d and an inner corner mold portion 36a, 36b, 36c, 36d. Each outer corner mold portion 35 has an inwardly facing concave surface (FIG. 8), while each inner corner mold portion has an outwardly facing convex surface (FIG. 8). Each pair of cooperating outer and inner corner mold portions 35a, 36a, is mounted on the baseplate 34 for coooperation therewith defining a mold cavity.

In accordance with important features of this invention and in order to complete the definition of the mold cavity, pairs of panels 42, 43 (FIGS. 6 and 8) are arranged with the mold instrumentalities 35a, 36a in such a way that the panels 42, 43 are spaced apart one from another and yet have respective end surfaces thereof forming portions of the boundary of the mold cavity. In particular, panels are clamped in spaced relation one to another with the major faces thereof extending at predetermined angulation to a corner axis (preferably at right angles as between the two panels, such as is shown in FIGS. 1, 2 and 8) and with the end surfaces of the panels each generally parallel to and spaced from the corner axis (FIGS. 3 and 8).

The clamping of the panels preferably is accomplished with the mold instrumentalities 35a, 36a. To this end, the outer corner mold portion 35a is fixed to the baseplate 34, while the cooperating inner corner mold portion 36a is supported for movement relative to the baseplate 34. Movement of the inner corner mold portion 36a is guided by a pair of sliding stub shafts 45, 46 (FIG. 7) and such movement occurs under impetus provided by a hydraulic cylinder 48 or other suitable actuating means. As will be understood, delivery of actuating fluid to the cylinder 48 through appropriate conduits 49, 50 may alternately move the inner corner mold portion 36a toward the outer corner mold portion 35a for clamping engagement with panels 42, 43 or withdraw the inner corner portion 36a therefrom to release an article of furniture.

In order to assure accurate positioning of panels to be bonded together in an article of furniture, the apparatus of this invention further includes locating pins 51 and spring loaded auxiliary side clamps 52. The locating pins 51 (FIGS. 5 and 8) preferably penetrate into the mounting openings 14, 25 bored in certain panel members (FIGS. 1 and 2) and the spacing of such mounting openings preferably is adapted to assure abutment of the locating pins 51 against the outer corner mold portions 35a (FIG. 8). The spring loaded side clamps 52 are arranged in such a manner as to abut longer panels (FIG. 6) midway of the length thereof and may penetrate blind holes bored into such panels at appropriate locations.

In accordance with the method of this invention, plastic material is deposited into the mold cavity bonded by respective end surfaces of spaced apart panels 42, 43 and the cooperating mold instrumentalities 35a, 36a (FIG. 8). The plastic material is then confined within the mold cavity and shaped into a corner configuration as determined by the configuration of the mold instrumentalities. In particular, mold cap means in the form of a closure member 55 is mounted adjacent the upper terminal ends of the mold cavities, for movement between an open position and a mold closing position (with the latter position being shown in FIG. 7). Preferably, the member 55 is mounted on a suitable toggle linkage clamping arrangement generally indicated at 56, which is in turn secured to the upper or outer terminal end of the corresponding one of the outer corner mold portions 35a, 35b, 35c, 35d, so that manipulation of a handle of the linkage means 56 moves the closure member 55 between a position withdrawn from the cooperating mold instrumentalities and a position closing the corresponding mold cavity.

With the mold cavity opened and panels clamped into position, the turntable 31 is rotated to move the mold asssembly and panels secured therein to a work station at which plastic material is desposited into the mold cavities and the cap means is closed to confine the plastic material. Preferably, as briefly described hereinabove, the plastic material deposited is in the form of reactants for forming structural foam. In this instance, the foam is confined to rise within the mold cavity and be shaped into the predetermined corner configuration while engaging the end surfaces of the panels and bonding the panels together.

Particularly in the latter instance, this invention contemplates that proper filling of the mold cavity and bonding of the panels be assured by certain apparatus and method features of the present invention. More particularly, both the panels received within the mold instrumentalities and the mold instrumentalities themselves are heated to an elevated temperature in preparation for the deposition of the plastic material into the mold cavity. In the instance of the mold instrumentalities, such heating is accomplished by electrical resistance heating elements embedded in the respective outer and inner mold corner portions. In the instance of the panels, heating is accomplished by passing the panels through or storing the panels in an appropriate oven. In one commercial embodiment of the present invention, the chip board and mold instrumentalities are heated to a temperature on the order of about 120 degrees F.

Additionally, this invention contemplates that proper bonding be facilitated by arranging the panels and cooperating mold instrumentalities to form inclined mold cavities, as will be noted particularly from FIG. 5. The inclination of the mold cavities is maintained as the mold assemblies move with the turntable 31, in order that the plastic material rise within the inclined mold cavity during bonding and shaping. In one commercial embodiment of this invention, the inclination of the mold cavities is on the order of about 50 degrees to the horizontal.

It will be understood that mold structures constructed as illustrated in FIGS. 5 and 6 may be employed in forming articles of furniture as shown in either of FIGS. 1 and 2. In using the mold structure of FIGS. 5 and 6 to produce shelves such as the shelf 10, only two pairs of cooperating mold corner portions are employed, with opposite ends of the major panel 11 being received therewithin for bonding to respective short panels 12, 13. When used in such a manner, two shelves may be simultaneously manufactured in a mold structure which is otherwise capable of producing one cabinet or case article such as the case 20. Similarly, panels of varying lengths can be accommodated by providing mold structures of varying dimensions, as is suggested in FIG. 4.

In the drawings and specification, there has been set forth a preferred embodiment of the invention, and although specific terms are employed, they are used in a generic and descriptive sense only and not for purposes of limitation.

That which is claimed is:

1. A method of manufacturing furniture by joining panels and making corners, the method comprising the steps of providing wooden panels each having generally parallel generally planar major faces and a generally planar end surface substantially perpendicular to and bounding one edge of said major faces, heating the panels to an elevated temperature, arranging mold instrumentalities and two heated panels to form a mold cavity bounded by the repsective end surfaces of the two panels and the mold instrumentalities, depositing in the mold cavity reactants for forming structural foam and bonding the two heated panels together with the foam while confining the foam within the mold cavity and shaping the foam into a predetermined corner configuration.

2. A method according to claim 1 further comprising the step of heating the mold instrumentalities to an elevated temperature in preparation for deposition of plastic material into the mold cavity.

3. A method according to claim 1, wherein the step of arranging the mold instrumentalities and panels comprises clamping the panels in spaced relation one to the other with the major faces thereof extending at predetermined angulation to a corner axis and with the end surfaces thereof each generally parallel to and spaced from the corner axis.

4. A method according to claim 3 wherein the step of arranging the mold instrumentalities and panels comprises clamping the panels with the mold instrumentalities.

5. A method of manufacturing furniture by joining panels and making corners, the method comprising the steps of providing wooden panels each having generally parallel generally planar major faces and a generally planar end surface substantially perpendicular to and bouncing one edge of said major faces, heating the panels to an elevated temperature, arranging mold instrumentalities and two heated panels to form a mold cavity bounded by the respective end surfaces of the two panels and the mold instrumentalities, depositing in the mold cavity reactants for forming structural foam and bonding the two heated panels together with the foam while confining the foam within the mold cavity and shaping the foam into a predetermined corner configuration.

6. A method of manufacturing furniture by joining panels and making corners, the method comprising the steps of providing wooden panels each having generally parallel generally planar major faces and a generally planar end surface substantially perpendicular to and bounding one edge of said major faces, heating the panels to an elevated temperature, arranging heated mold instrumentalities and two heated panels to form a mold cavity bounded by the respective end surfaces of the two panels and the mold instrumentalities, depositing in the mold cavity reactants for forming structural foam, bonding the two heated panels together with the foam while confining the foam within the mold cavity and shaping the foam into a predetermined corner configuration, and maintaining the mold instrumentalities at an elevated temperature during the depositing of reactants and bonding of panels while confining and shaping foam.

* * * * *